US011720139B2

(12) United States Patent
Suzuki et al.

(10) Patent No.: US 11,720,139 B2
(45) Date of Patent: Aug. 8, 2023

(54) DATA PROCESSING DEVICE, ELECTRONIC DEVICE, DATA PROCESSING METHOD, AND STORAGE MEDIUM

(71) Applicant: CASIO COMPUTER CO., LTD., Tokyo (JP)

(72) Inventors: Hideo Suzuki, Ome (JP); Toshiya Sakurai, Tokyo (JP); Takeshi Matsue, Kokubunji (JP); Masanori Ishihara, Hamura (JP); Youhei Saitoh, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 63 days.

(21) Appl. No.: 17/547,063

(22) Filed: Dec. 9, 2021

(65) Prior Publication Data
US 2022/0197331 A1 Jun. 23, 2022

(30) Foreign Application Priority Data
Dec. 22, 2020 (JP) .................................. 2020-212240

(51) Int. Cl.
*G06F 1/12* (2006.01)
(52) U.S. Cl.
CPC ...................................... *G06F 1/12* (2013.01)
(58) Field of Classification Search
CPC ........................................................ G06F 1/12
See application file for complete search history.

(56) References Cited

U.S. PATENT DOCUMENTS

| 7,924,884 B2 * | 4/2011 | Kailash ................. H04L 43/024 |
| | | 709/224 |
| 9,197,079 B2 | 11/2015 | Yip et al. |
| 10,476,278 B2 | 11/2019 | Yip et al. |
| 10,558,261 B1 * | 2/2020 | Zhang .................. G06F 3/0346 |
| 11,133,681 B2 | 9/2021 | Yip et al. |

(Continued)

FOREIGN PATENT DOCUMENTS

| JP | 2000134144 A | 5/2000 |
| JP | 2014517983 A | 7/2014 |

(Continued)

OTHER PUBLICATIONS

Japanese Office Action dated Jan. 18, 2022 (and English translation thereof) issued in Japanese Application No. 2020-212240.

*Primary Examiner* — Aurel Prifti
(74) *Attorney, Agent, or Firm* — Holtz, Holtz & Volek PC (57) ABSTRACT

Disclosed is a data processing device including: at least one processor that executes a program stored in at least one memory; and a timer that repeatedly and continuously counts a setting time. The processor acquires data indicating a battery state, judges occurrence of an event, executes processing based on data acquired in the setting time when judging that the event has not occurred between start and end of counting for one setting time, and executes at least one of a first operation of performing the processing based on data from the counting start to a stop timing based on the event occurrence and a second operation of performing the processing based on data from a start timing based on an event occurrence timing to end of counting for one setting time when judging that the event has occurred between the start and the end of the counting.

17 Claims, 6 Drawing Sheets

(56) References Cited

U.S. PATENT DOCUMENTS

| | | | |
|---|---|---|---|
| 11,188,135 B2 | 11/2021 | Kamijima | |
| 2004/0257045 A1* | 12/2004 | Sada | G01R 31/3648 320/132 |
| 2008/0140338 A1* | 6/2008 | No | G06F 1/3206 702/160 |
| 2012/0014377 A1* | 1/2012 | Joergensen | H04L 43/106 370/352 |
| 2012/0023353 A1* | 1/2012 | Lee | H04N 13/398 713/323 |
| 2012/0155497 A1* | 6/2012 | Lee | H04J 3/0697 370/507 |
| 2013/0132759 A1* | 5/2013 | Lathrop | G06F 11/3062 713/340 |
| 2015/0137618 A1* | 5/2015 | Vaajala | H02J 7/00718 307/116 |
| 2015/0369874 A1* | 12/2015 | Park | B60L 58/12 702/63 |
| 2016/0058337 A1* | 3/2016 | Blahnik | G16H 20/40 600/595 |
| 2018/0309851 A1* | 10/2018 | Fujisaki | H04L 67/01 |
| 2020/0125467 A1* | 4/2020 | Sultenfuss | G06F 9/3865 |
| 2020/0326382 A1 | 10/2020 | Matsumura et al. | |

FOREIGN PATENT DOCUMENTS

| | | |
|---|---|---|
| JP | 2018186611 A | 11/2018 |
| JP | 2019061872 A | 4/2019 |
| JP | 2020109590 A | 7/2020 |
| WO | 2017022169 A1 | 2/2017 |
| WO | 2019131825 A1 | 7/2019 |

* cited by examiner

| EVENT ID | EVENT CONTENTS | SETTING TIME T0 |
|---|---|---|
| 000 | NORMAL | 20 MINUTES |
| 001 | DATE CHANGE | 20 MINUTES |
| 002 | CHARGING START | 5 MINUTES |
| 003 | CHARGING END | 20 MINUTES |
| 004 | WIRELESS LAN COMMUNICATION START | 10 MINUTES |

FIG.5B

| MEASUREMENT VALUE | ACQUIRED VALUE | TYPE OF AGGREGATE DATA |
|---|---|---|
| VOLTAGE | VOLTAGE | AVERAGE VALUE, VARIANCE VALUE |
| CURRENT | CURRENT | AVERAGE VALUE, TOTAL CHARGE CURRENT, TOTAL DISCHARGE CURRENT, AVERAGE CHARGE CURRENT, AVERAGE DISCHARGE CURRENT |
| CURRENT | INTERNAL RESISTANCE VALUE | AVERAGE VALUE |
| CURRENT | REMAINING AMOUNT OF STORED ELECTRICITY | FINAL VALUE |
| TEMPERATURE | TEMPERATURE | AVERAGE VALUE, MINIMUM VALUE, MAXIMUM VALUE |

FIG.6

DATA PROCESSING DEVICE, ELECTRONIC DEVICE, DATA PROCESSING METHOD, AND STORAGE MEDIUM

CROSS-REFERENCE TO RELATED APPLICATION

The present application is based upon and claims the benefit of priority from the prior Japanese Patent Application No. 2020-212240, filed on Dec. 22, 2020, the entire contents of which are incorporated herein by reference.

BACKGROUND

Technical Field

The present disclosure relates to a data processing device, an electronic device, a data processing method, and a storage medium.

Description of Related Art

Portable electronic devices each have a built-in battery and operate with power supplied from this battery. Various parameters related to the monitoring of battery status are measured, and the measurement data is acquired and analyzed to obtain degradation information, which can be used to improve the battery and improve the operating condition according to the battery in the electronic device. There is also technology that controls charging and discharging by monitoring the ratio (charge rate), etc., of the amount of electricity (remaining amount of stored electricity) actually stored in the secondary battery (storage battery) to the amount of electricity (electrical storage capacity) that can be stored in the secondary battery.

Some electronic devices, especially those that are small and lightweight and used for specific applications, do not have performance beyond that required for the application of the device, and do not necessarily have the sufficient configuration to process these measurement data that are not directly used in the operation of the device. Therefore, some or all of the analysis processes for the battery state of such electronic devices may be performed by an external server device or other device with high data processing and computing power. Data acquired by an electrical storage device or an electronic device with a battery is temporarily stored and retained in the memory of the electronic device and transmitted to the outside as appropriate or in response to a request from the server device, etc. (for example, JP 2014-517983 A and JP 2019-61872 A).

SUMMARY

According to an aspect of the present disclosure, there is provided a data processing device including: at least one processor that executes a program stored in at least one memory; and a timer that repeatedly and continuously counts a setting time, wherein the at least one processor acquires data indicating a state of a battery, judges whether an event determined in advance has occurred, executes processing determined in advance based on the data acquired in the setting time in response to judgement that the event has not occurred between start and end of counting for one setting time by the timer, and executes at least one of a first operation and a second operation in response to judgement that the event has occurred between the start and the end of the counting for the one setting time, the first operation being an operation of performing the processing based on the data acquired from the start of the counting to a stop timing based on occurrence of the event, and the second operation being an operation of performing the processing based on the data acquired from a start timing based on an occurrence timing of the event to end of counting for one setting time by the timer.

BRIEF DESCRIPTION OF DRAWINGS

The accompanying drawings are not intended as a definition of the limits of the disclosure but illustrate embodiments of the disclosure, and together width the general description given above and the detailed description of the embodiments given below, serve to explain the principles of the disclosure, wherein.

DETAILED DESCRIPTION OF EMBODIMENTS

Hereinafter, an embodiment of the present disclosure will be described with reference to the drawings.

Figure 1:
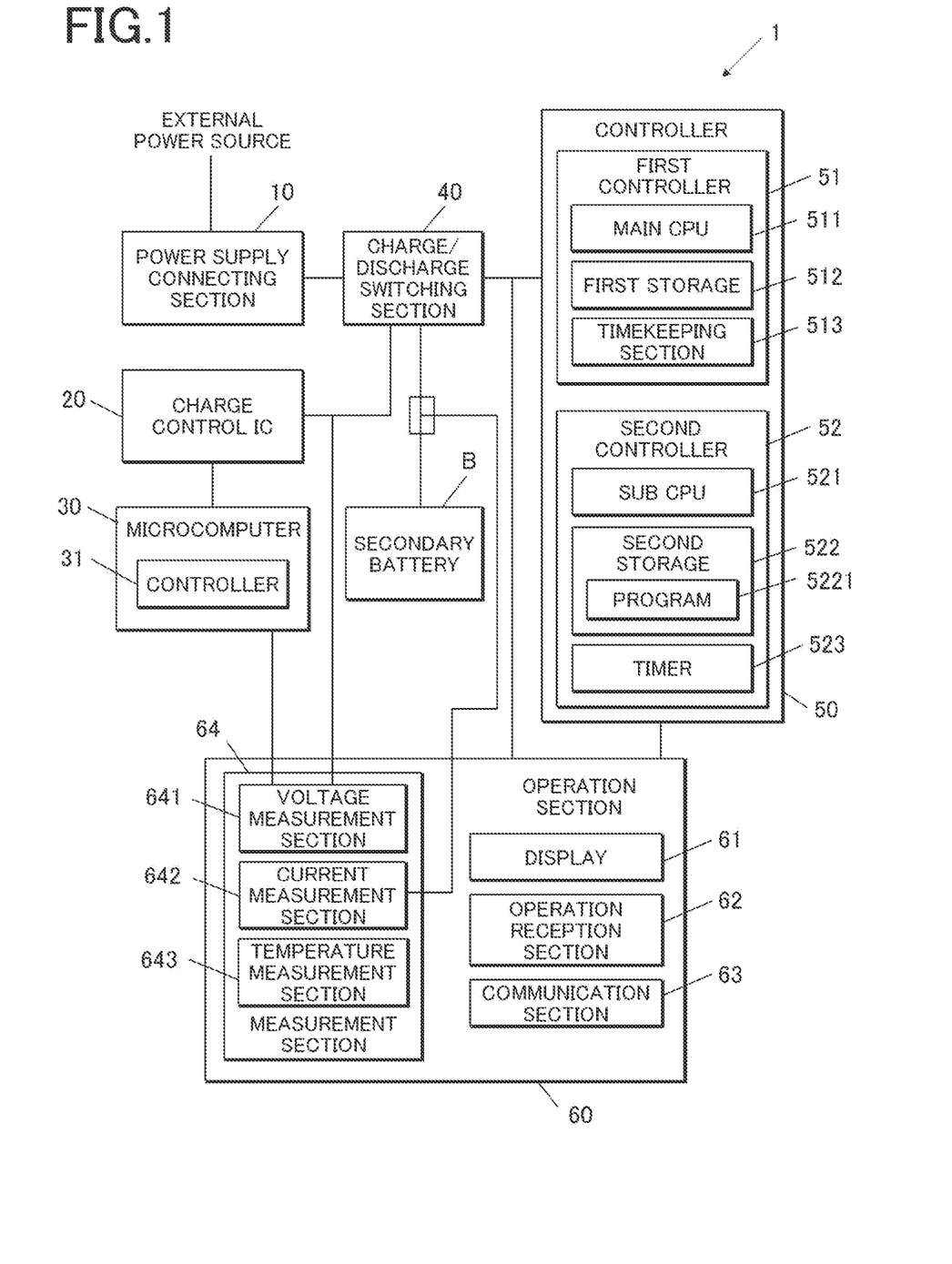
FIG. 1 is a block diagram showing the functional configuration of an electronic device.

FIG. 1 is a block diagram showing the functional configuration of an electronic device 1 including a data processing device in the embodiment.

The electronic device 1 is a portable device, for example, a terminal device that can be worn on the body, such as on the arm. Alternatively, the electronic device 1 may operate continuously or intermittently for some time in situations where it is not possible (or difficult) to connect to an external power source such as a commercial power source (e.g., outdoors). The electronic device 1 includes a power supply connecting section 10, a charge control IC 20 (Integrated Circuit), a microcomputer 30, a charge/discharge switching section 40, a controller 50, an operation section 60, etc. A secondary battery B (battery) is built into the electronic device 1 to supply power from the secondary battery B to the controller 50 and the operation section 60, etc. when the charge/discharge switching section 40 is in the discharge state.

The power supply connecting section 10 is connected to the wiring from an external power source. The power supply connecting section 10 has, for example, an input terminal to input power of a certain DC voltage for operation and charging, which is converted from AC power by a commercial power supply in a voltage converter (adapter) located in the middle of the above wiring. Alternatively, the power supply connecting section 10 may include a USB (Universal Serial Bus) terminal or the like, and may be capable of receiving USB power supply.

The charge control IC 20 switches and controls the power supply to the controller 50 and the operation section 60 and the charging of the secondary battery B in the charge/discharge switching section 40. The charge control IC 20 switches the opening and closing of current paths based on the presence or absence of the connection of an external power source to the power supply connecting section 10 and the measurement information of the voltage measurement section 641.

The microcomputer 30 controls the operation of the charge control IC 20 based on the measurement data of the voltage measurement section 641 and the current measurement section 642. The microcomputer 30 has a controller 31, which includes a hardware processor for control operations, and other components.

The charge/discharge switching section 40 opens and closes current paths such as the power supply path from the secondary battery B to the controller 50 and the operation section 60, and the charge path from the power supply connecting section 10 to the secondary battery B. The charge/discharge switching section 40 has, for example, an analog switch, and the opening and closing of the analog switch is switched by the charge control IC 20 to open and close the above current paths.

The controller 50 performs various control operations of operations of the operation section 60 and other components, and also operates the operation section 60 to acquire and process measurement data and the like. The controller 50 includes a first controller 51 and a second controller 52 (which forms the data processing device and computer of this embodiment). The second controller 52 has lower performance than the first controller 51 and consumes less power than the first controller 51. When the electronic device 1 continuously performs only the basic minimum functions (basic functions), such as timekeeping and displaying of the current time, the power consumption can be reduced by setting the electronic device 1 to the power saving mode in which at least part of the operation of the first controller 51 is stopped and the execution of the basic functions is controlled by the second controller 52. On the other hand, when the electronic device 1 executes functions (extended functions) other than the basic functions, the required performance can be obtained by setting the electronic device 1 to the normal mode in which the first controller 51 is operated to control the execution of extended functions. As for the basic functions (timekeeping and displaying of time), for example, in the power saving mode, the second controller 52 may display only the hours and minutes in black and white, whereas in the normal mode, the first controller 51 may display the date and the hours, minutes, and seconds in color.

The first controller 51 has a main CPU 511 (Central Processing Unit), a first storage 512, a timekeeping section 513, and the like. The main CPU 511 performs arithmetic processing, starts various application programs pertaining to extended functions that can be executed in the normal mode, and controls the operation of the electronic device 1 pertaining to the extended functions being executed. The main CPU 511 includes registers. The operation of the main CPU 511 is stopped in the power saving mode.

The first storage 512 includes a volatile memory such as a RAM (Random Access Memory) and a non-volatile memory such as a flash memory. The volatile memory provides memory space for work to the main CPU 511 and stores temporary data. In the power saving mode, the RAM may continue to perform minimal operations to maintain the data stored in the volatile memory, for example, refreshing operations for DRAM and supplying voltage for SRAM. Alternatively, the RAM may stop its operation by moving the temporary data in the volatile memory to the non-volatile memory in the power saving mode.

The timekeeping section 513 outputs the current date and time, which is identified by counting signals of a certain frequency. The date and time to be counted may be that of the time zone (local time) to which the location where the electronic device 1 (secondary battery B) is currently located belongs, or may be fixed to that of a specific time zone. The time zone information may be stored and retained separately in the first storage 512, and may be used to display the time zone information, or may be used to convert the date and time of a specific time zone to the local time of the time zone to which the current location belongs when the date and time of the specific time zone is counted. The date and time output by the timekeeping section 513 is accurate enough to be used in a clock function, for example, the amount of deviation from the exact date and time is 0.5 seconds or less per day. The timekeeping section 513 may be a specific hardware circuit, or the main CPU 511 may count and retain the date and time on the RAM of the first storage 512. The date and time counted by the timekeeping section 513 may be modifiable as appropriate based on date and time data acquired externally by the operation section 60 (such as the communication section 63 and the measurement section 64 described below).

The second controller 52 has a sub CPU 521 as at least one processor, a second storage 522 as at least one memory, a timer 523, and the like. The sub CPU 521 performs various arithmetic processing and controls the operation of the electronic device 1 in the power saving mode. The sub CPU 521 includes registers. The operation of the electronic device 1 in the power saving mode includes the date and time counting and display operations described above and the processing related to the acquisition of the state of the secondary battery B described below. In addition, if the communication section 63 is capable of performing short-range wireless communication, such as Bluetooth (registered trademark) Low Energy, which can be performed mainly with a low load, the sub CPU 521 may perform communication control pertaining to minimum communication with external communication devices, for example, periodic reception of date and time information and notifications of the occurrence of events in external communication devices. In the power saving mode, the sub CPU 521 may be deactivated at timings other than the periodic operation of the electronic device 1.

The second storage 522 includes a volatile memory and a non-volatile memory. The volatile memory is, for example, a RAM, which provides the sub CPU 521 with memory space for work and stores temporary data. The non-volatile memory stores the program 5221 used to control the core operation and aggregate data of measurement data indicating the state of the secondary battery B.

The timer 523 is, for example, an OS timer, which repeatedly and continuously counts a preset time (setting time T0). The timer 523 basically outputs a certain alarm signal every time the setting time T0 elapses from the start of counting (every time the elapsed time from the start of counting reaches the setting time T0), and also initializes the count as a result of counting and starts counting from zero again. The setting time T0 is not particularly limited, but may be, for example, 20 minutes as described below, and may also be changeable by setting. The clock signal that is the source of the counting by the timer 523 has a lower temporal precision than the clock signal when the timekeeping section 513 counts the date and time. Therefore, the elapsed time which is the accumulated time counted by the timer 523 has a deviation from the actual elapsed time. The magnitude of this deviation varies depending on the state of the electronic device 1, such as the temperature environment and the operating load of the sub CPU 521 (e.g., one to several minutes during the counting of a day, i.e., while the setting time T0 of 20 minutes is counted 72 times).

The operation section 60 performs operations related to various functions of the electronic device 1. The operation section 60 includes, for example, a display 61, an operation reception section 62, a communication section 63, and a measurement section 64.

The display 61 has a display screen that can display various characters, signs, and patterns. The display screen is, for example, a liquid crystal display screen, but it can also be something else, such as an organic EL (Electro-Luminescent) display screen. The display 61 may be configured to change the display state between normal operation and power saving mode, so that the power consumption for display in the power saving mode is smaller than the power consumption for display in normal operation.

The operation reception section 62 accepts input operations from outside, such as a user, and outputs input signals based on these input operations to the controller 50. The operation reception section 62 includes, for example, a touch panel and a push button switch. The touch panel is positioned overlapping the display screen of the display 61, detects contact operations, and outputs information on the contact position during the detection thereof. The input detection of the touch panel may be paused (e.g., the information of the contact position is simply input only to the first controller 51) when a certain input operation is accepted or in a power saving mode. The push button switch may be capable of accepting operations regardless of the operation mode, and may, for example, be made to return from the power saving mode to the normal operation mode by pressing the push button switch (which may be a long press for a set time or longer, etc.). In this case, for example, the second controller 52 detects the return operation and resumes the operation of the first controller 51 in response to the detection of the return operation.

The communication section 63 controls wireless communication with external devices in accordance with a communication standard. The communication standard that can be controlled by the communication section 63 may be, for example, communication by a wireless LAN (Local Area Network) or communication by Bluetooth. If the electronic device 1 can be connected to a wired cable, the communication section 63 may also be able to control communication via the wired cable, for example, LAN communication or USB (Universal Serial Bus) communication.

The measurement section 64 measures various physical quantities, generates measurement data according to the measurement results, and outputs the data to the controller 50, etc. Various types of measurement targets are determined according to the function, etc. of the electronic device 1. In the embodiment, the measurement section 64 has a voltage measurement section 641, a current measurement section 642, and a temperature measurement section 643 as a configuration for measuring the state of the secondary battery B. In addition to the above, for example, the device may have a sensor for measuring a geomagnetic field according to an orientation measurement display function, an acceleration sensor for measuring a state of motion, a barometric pressure sensor pertaining to an altitude and/or a weather condition, and an illumination sensor pertaining to a state of the surroundings of the electronic device 1.

The voltage measurement section 641 measures the output voltage according to the amount of electricity stored in the secondary battery B, and generates and outputs measurement data according to the measurement results. In addition to being output to the controller 50, the measurement results are output to the microcomputer 30 and may be used for estimating the remaining amount of stored electricity (charge rate) of the secondary battery B (estimation may be performed by the controller 50) and for driving the switching of the charge/discharge switching section 40 for charging/discharging by the charge control IC 20.

The current measurement section 642 measures the charge current to and discharge current from the secondary battery B (collectively, charge/discharge current), and generates and outputs measurement data according to the measurement results. The measurement results are output to the controller 50. The measurement results may also be output to the microcomputer 30 and used for judging the end of the charging operation during charging, or for path blocking control when an abnormality occurs in the current. The current measurement section 642 may be capable of not only measuring the current but also calculating the internal resistance value, etc. of the secondary battery B based on the current value.

The temperature measurement section 643 measures the temperature at a certain position of the electronic device 1, and generates and outputs measurement data according to the measurement results. The certain position is a position at which the surface temperature of the secondary battery B can be measured, such as, but not limited to, a position that is in contact with the secondary battery B. The certain position may be a position where the surface temperature of the secondary battery B can be estimated (e.g., the surroundings of the secondary battery B).

The secondary battery B is not limited to any particular type, but in the embodiment, the secondary battery B is a lithium-ion battery. The secondary battery B supplies power to the controller 50 and the operation section 60 when the charge/discharge switching section 40 is enabled for discharge. When the charge/discharge switching section 40 is enabled to charge, power is supplied from an external power source via the power supply connecting section 10 to charge the secondary battery B. The secondary battery B may be provided in the electronic device 1 or may be detachable and replaceable with respect to the electronic device 1.

Next, the acquisition and processing of measurement data related to monitoring of the secondary battery B in this embodiment will be described.

Figure 2:
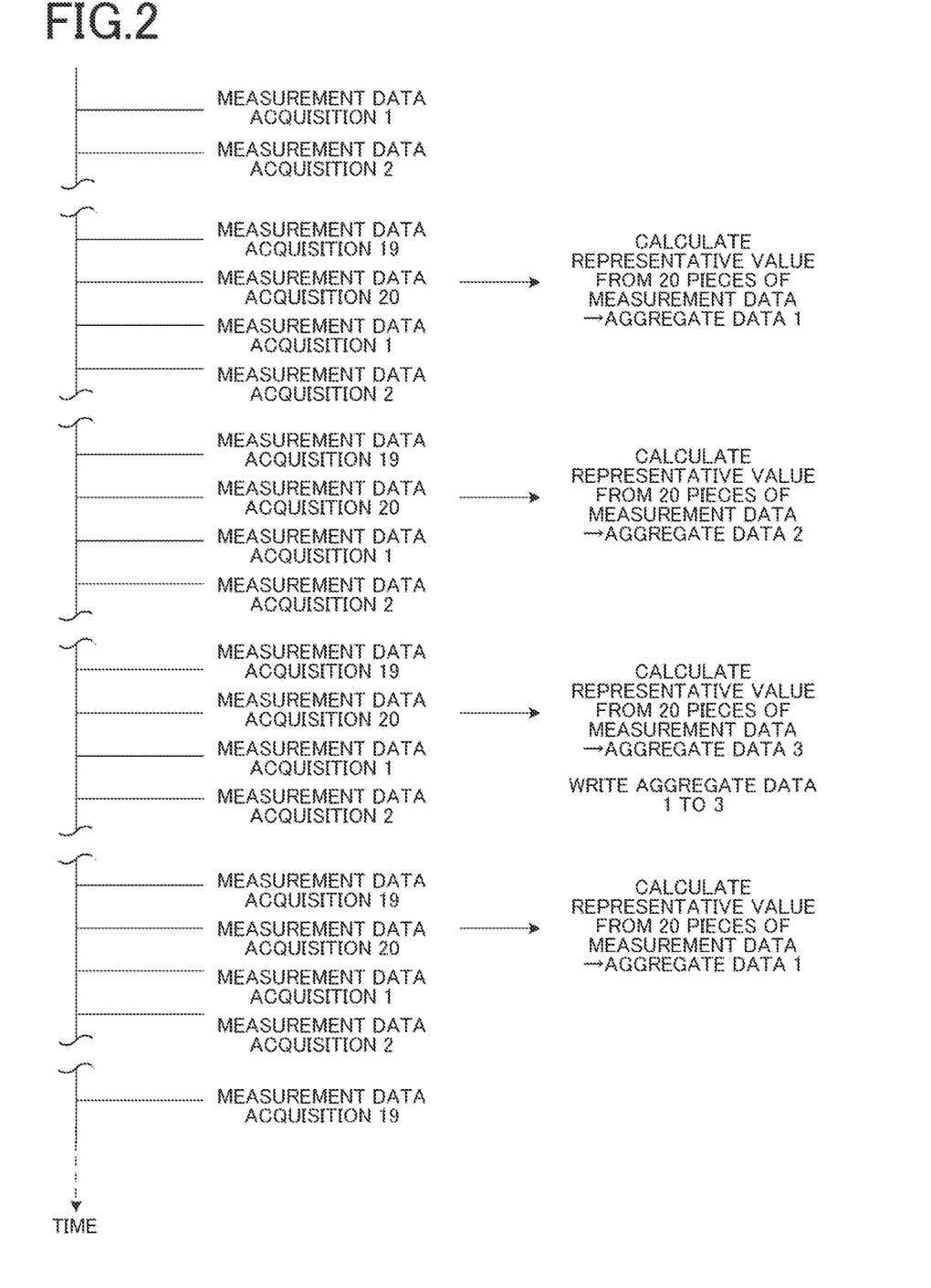
FIG. 2 is a view for explaining acquisition of measurement data.
Figure 3:
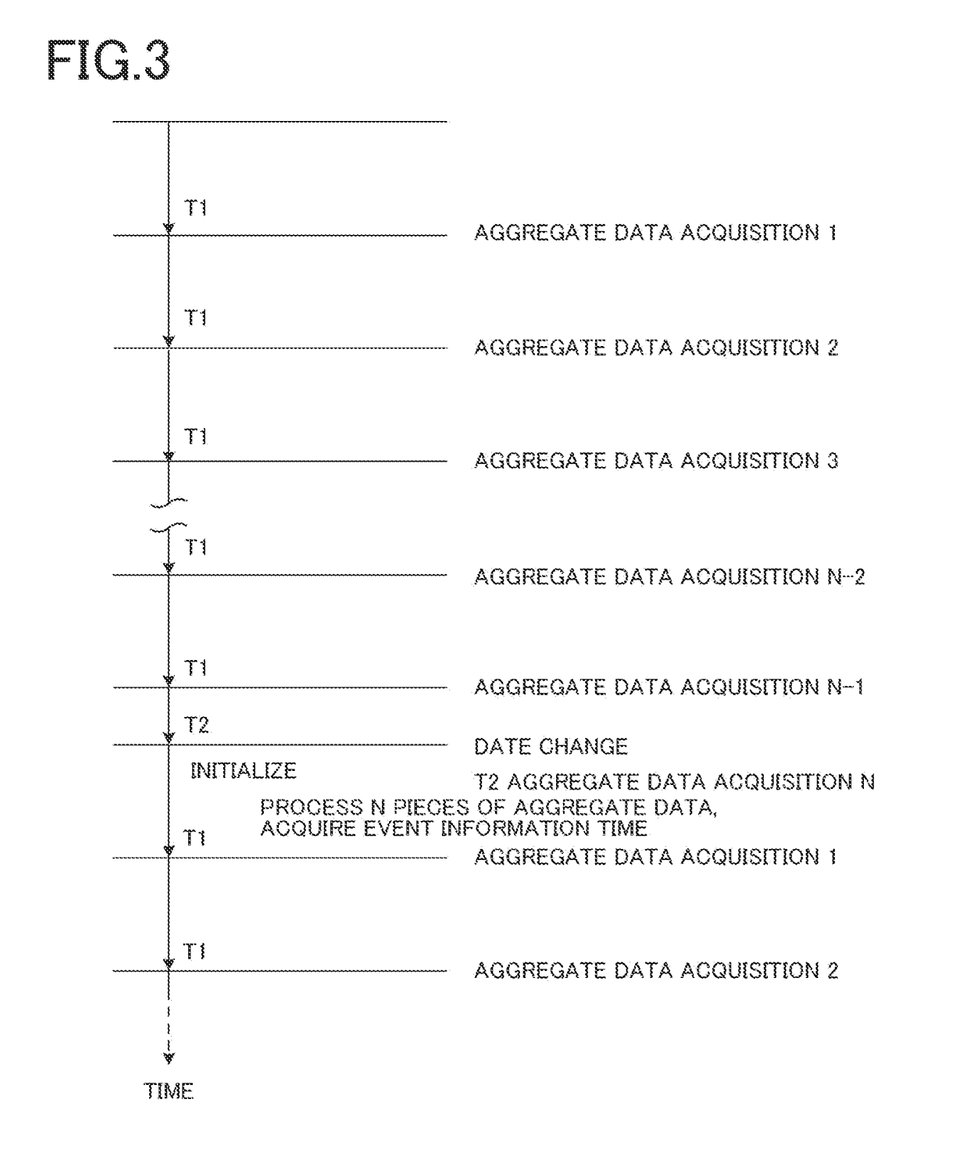
FIG. 3 is a view for explaining acquisition of measurement data.
Figure 4:
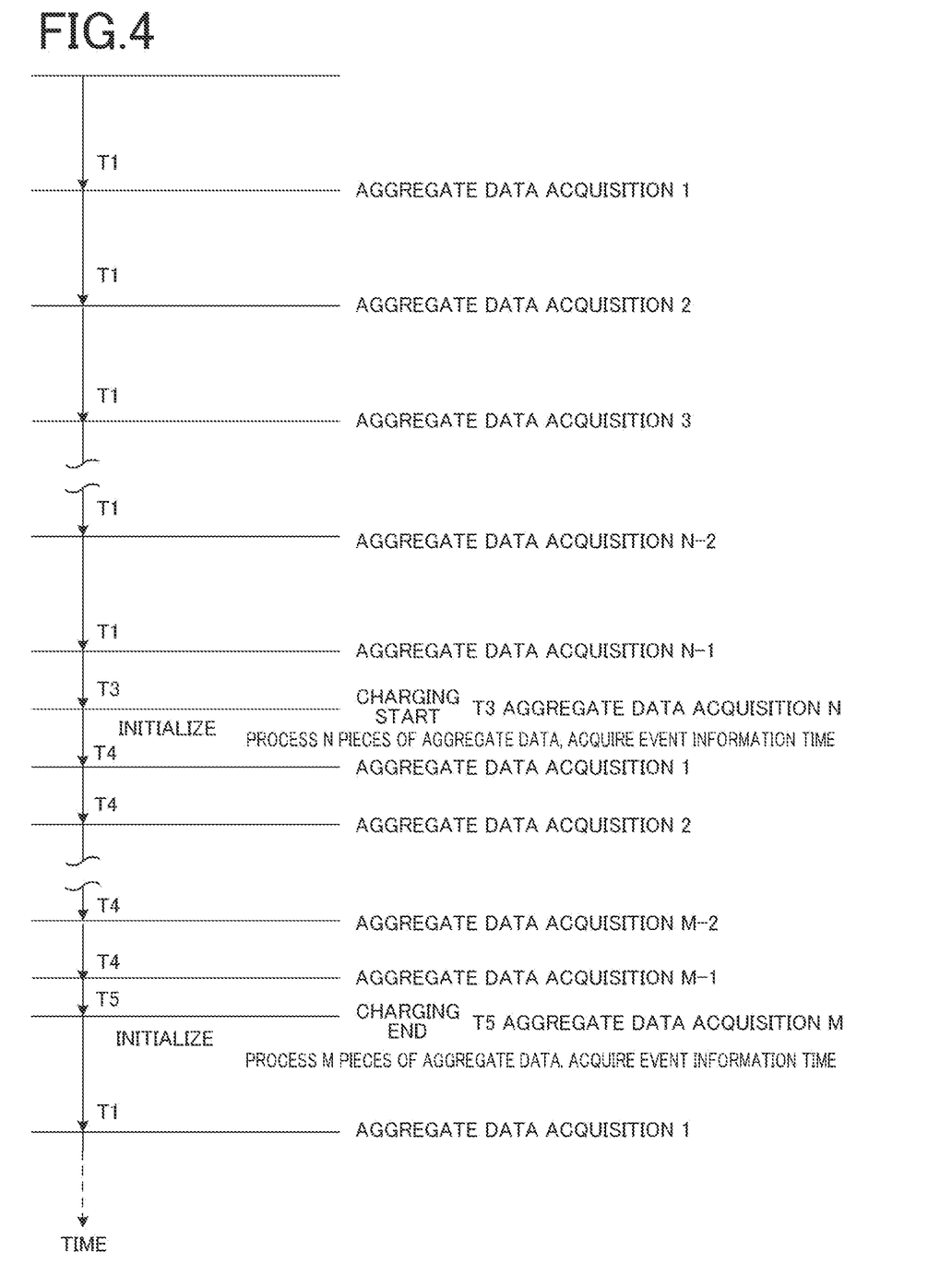
FIG. 4 is a view for explaining acquisition of measurement data.

FIGS. 2 to 4 illustrate the acquisition of measurement data. As shown in FIG. 2, measurement data (data indicating the state of the battery) by the voltage measurement section 641, current measurement section 642, temperature measurement section 643, etc. are acquired at intervals determined in advance, for example, sampling at one-minute intervals, and are temporarily stored and retained in registers, etc. of the sub CPU 521. The measurement data to be stored and retained is not limited to the acquired values themselves, but may be data mechanically corrected or subjected to arithmetic or conversion processing determined in advance. The intervals of the above sampling are determined according to the measurement by the timer 523. The acquisition of the plurality of pieces of measurement data may be performed at intervals different from each other. Alternatively, the measurement data may be acquired irregularly rather than at fixed intervals.

In this case, if all the acquired measurement data is retained in the register, the data occupies a large amount of the register's memory capacity. Thus, the number of pieces of this measurement data (20 in the embodiment, for example) is determined according to the sampling interval (e.g., 1 minute interval as described above) and the setting time T0 (e.g., 20 minutes), and the aggregation processing of the 20 pieces of measurement data is performed (processing determined in advance and based on the data) when the determined number of pieces of measurement data is acquired. The number of pieces of acquired data may increase or decrease due to measurement failure or measurement deviation of the timer 523. The same applies hereinafter. In this aggregation processing, for example, a representative value, for example, an average value, is calculated and obtained as aggregate data from these 20 pieces of measurement data. This representative value (aggregate data) may be of a different type or a plurality of types, depending on the measurement contents and needs. For example, as the representative value, not only the average value but also the maximum and minimum values may be obtained, and the variance and standard deviation as the degree of variation may be calculated. The representative value may also be converted to other values corresponding to the content of the measurement data. For example, based on the average value of the voltage values or the total discharge current (temperature may also be taken into account), the remaining amount of electricity stored in the secondary battery B and the like may be obtained. After the aggregate data is calculated, the measurement data which is the calculation source is erased. The aggregate data is stored in the order in which it was acquired, but no separate information such as date and time (time stamp) is attached.

The aggregate data stored in the register is further written collectively to the flash memory of the second storage 522 an stored every time the aggregate data is acquired and retained for a reference number of times (two or more standard times) determined in advance, for example, three times. Since writing to the flash memory is limited in the number of times and requires a higher voltage than writing to RAM (registers), etc., the writing processing for a plurality of pieces of aggregate data together reduces the amount of time and effort required and extends the life.

In such aggregation processing, if the aggregation is made including both measurement data before and after the timing of occurrence of an event (state change event) in which the state such as the usage state of the secondary battery B changes, it will be difficult to classify the obtained aggregate data appropriately when analyzing it. In addition, since the time counting accuracy of the timer 523 is not very high as described above, the accumulation of the data will result in a large discrepancy from the actual date and time counted by the timekeeping section 513. Information on the time, especially the local time of the location where the electronic device 1 (its user) is located, can be useful for analysis. Therefore, it is recommended that the timer 523 is periodically initialized at the timing when the date and time counted by the timekeeping section 513, which is more accurate than the timer 523, becomes a specific time, e.g., at the date change timing (0:00:00), so that the timing of initialization of the counting can be adjusted. As for the types of events for which it is desirable to separate the measurement data into different aggregate data before and after the occurrence of an event when aggregation is performed, i.e., events that include a state change event and art event that the time becomes a specific time (in the embodiment, a date change event), the types of events may be determined in advance and stored and retained in the second storage 522 as specific events (events determined in advance). The data of the specific event may include additional information as described below. When the sub CPU 521 obtains a notification of the occurrence of an event through interrupt process or the like, the sub CPU 521 judges whether the event corresponds to this event determined in advance.

As shown in FIG. 3, when the date of the date and time counted by the timekeeping section 513 changes while the aggregate data is acquired every time T1 (equal to the setting time T0), an interrupt signal is input from the first controller 51 or the second controller 52, and a date change event occurs. If the above-mentioned specific event occurs between the start and the end of the counting of one setting time T0 (in this embodiment, counting time T2), even if it is in the middle of the counting of the setting time T0 (in this embodiment, counting time T2), the measurement data acquired up to that timing (stop timing) is aggregated (processed as described above), and thereby the Nth aggregate data is acquired (first operation). The aggregate data retained up to this point including the newly acquired aggregate data, information indicating that a date change event has occurred, and information on the date and time of occurrence of the event (at least the occurrence time information, time stamp) are written to the flash memory of the second storage 522.

The count number in the middle of counting may be initialized at this stop timing, and the counting by the timer 523 may be started (resumed) from zero, continuing from the stop timing as the start timing. There may be a slight time difference between the stop timing and the start timing when counting is resumed. After the count number is initialized, the measurement data is acquired again at sampling intervals, and new aggregate data after the event (date change) is calculated again every time T1 (setting time T0) (the first processing (aggregation) after resumption is the second operation).

As shown in FIG. 4, other specific events in which interruptions are considered between the start and end of counting of one setting time T0 include, for example, the start and end of charging of the secondary battery B. During charging, the charge current of the secondary battery B increases and the voltage change, etc., also increases. Thus, the setting time T0 may be changed from time T1 to time T4, which is shorter than time T1. This change in the setting time T0 may be made from the occurrence of the charging start event to the occurrence of the charging end event. The information on the setting time T0 is stored in advance in the flash memory or ROM of the second storage 522, and may be read out and used as needed. When a charging start event occurs after the N−1th aggregate data of a certain day has been acquired, the Nth aggregate data during the time T3 up to that point (end timing) is acquired (first operation), and then the setting time T0 is switched to the time T4 to resume counting and measurement (start timing) and perform new aggregation (the first processing (aggregation) after the resumption is the second operation). When the charging end event occurs after M−1 pieces of aggregate data have been obtained from the start of charging, the measurement data during the time T5 up to that point (stop timing) is aggregated to generate the Mth aggregate data (first operation). After that, the setting time T0 is set back to time T1, counting and measurement are resumed (start timing), and new aggregation is performed (the first processing (aggregation) after resumption is the second operation). If the charging method is further divided into constant current charging and constant voltage charging, the charging method switching event may be included in the specific event.

Figure 5A:
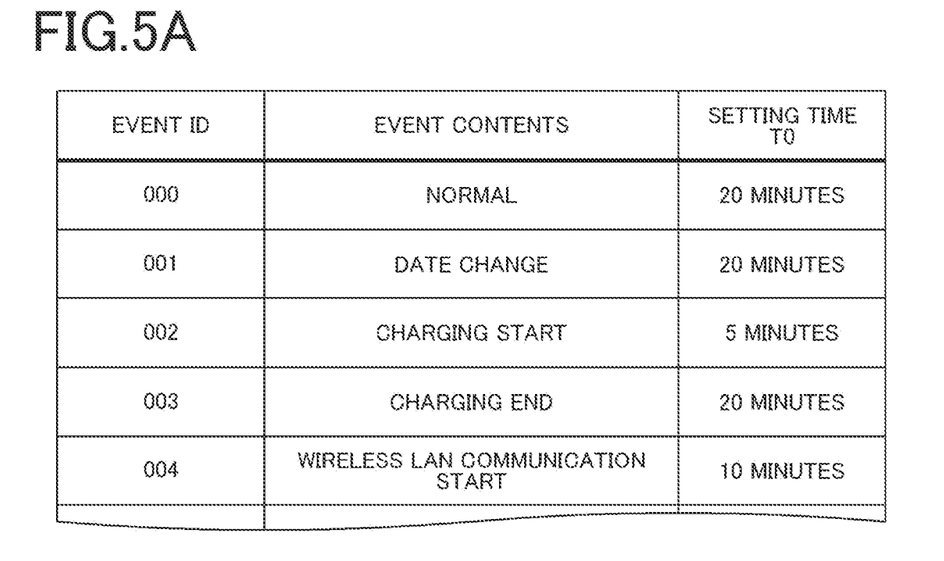
FIG. 5A is a diagram showing an example of the contents of setting data.
Figure 5B:
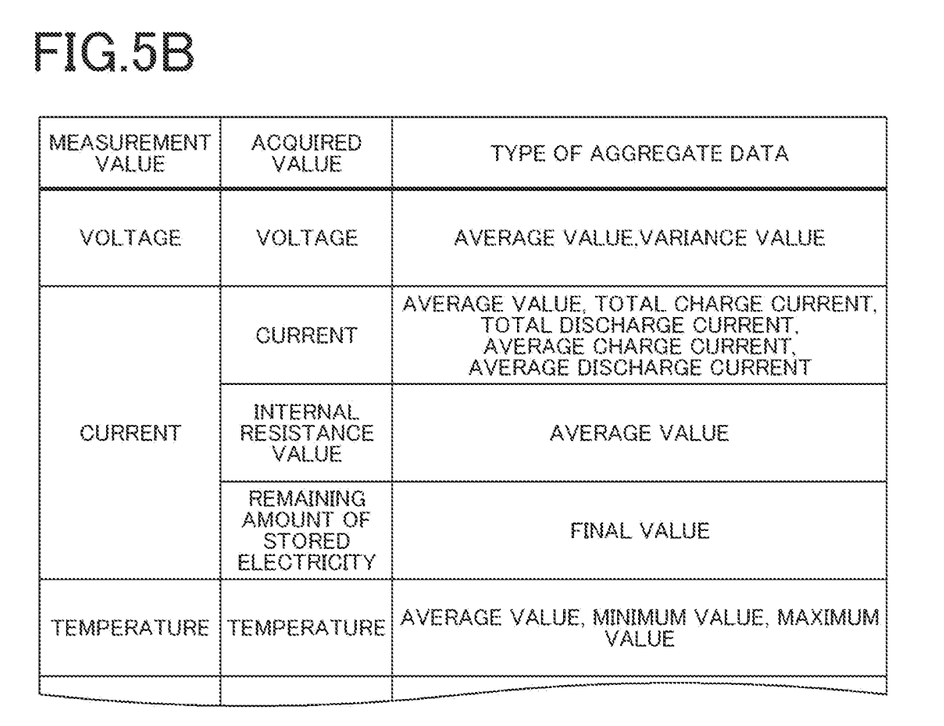
FIG. 5B is a diagram showing an example of the contents of setting data.

FIGS. 5A and 5B show an example of the contents of the setting data.

FIG. 5A shows the correspondence between setting times and events.

For the period between the occurrence of a specific event indicating the start of the execution of a function of the electronic device 1, which is performed continuously or intermittently for a certain duration, and the occurrence of a specific event indicating the end of the execution of the function, such as the charging start event and the charging end event described above, the setting time T0 can be set to a different length compared to the setting time for normal time. The same applies to other functions which may include, for example, the function of executing wireless LAN communication by the communication section 63, which is an operation that consumes more power than normal time. This information on the setting time T0 according to the event type may be additionally retained for the information on specific events described above. In the embodiment, the setting time T0 is set to 5 minutes during charging and 10 minutes during execution of wireless LAN communication, while the setting time T0 at normal time is 20 minutes. The period when the first controller 51 is operating in the normal mode may be set as the normal time, and the setting time T0 may be set longer than the normal time during the period when the first controller 51 is stopped in the power saving mode. Since the "normal" indicated by the event ID 000 is not an event, the "normal" may not be set, or may be set only until, for example, the first event occurs after startup. When an event occurs, the information on the setting time T0 may also be read out and the setting time T0 may be changed. In the case where the setting time T0 is not changed but is a fixed value, there is no need to add and retain the information on the setting time T0 to the information on the specific event. For example, the setting time T0 may be stored and retained as a constant in the program 5221.

FIG. 5B is a diagram showing the correspondence between the measurement data and the aggregate data obtained from the measurement data.

In the case of obtaining the aggregate data of voltage based on the measurement data of voltage, for example, it is sufficient no obtain a simple average value and a variance value indicating the degree of variation. On the other hand, when obtaining the aggregate data based on the measurement data of current, the total amount and the average value can be obtained separately for each of the charge current and the discharge current. In addition, as described above, the internal resistance value and the remaining amount of stored electricity can be obtained from the current measurement data. As an example, the internal resistance value may be obtained as an average value based on the total discharge current of the current, etc., and the remaining amount of stored electricity may be obtained as a final value based on the magnitude of the total discharge current (or the final voltage value as described above). In the case of obtaining aggregate data based on temperature measurement data, in addition to the average value, the maximum and minimum values during the setting time T0 may be obtained instead of the degree of variation.

Figure 6:
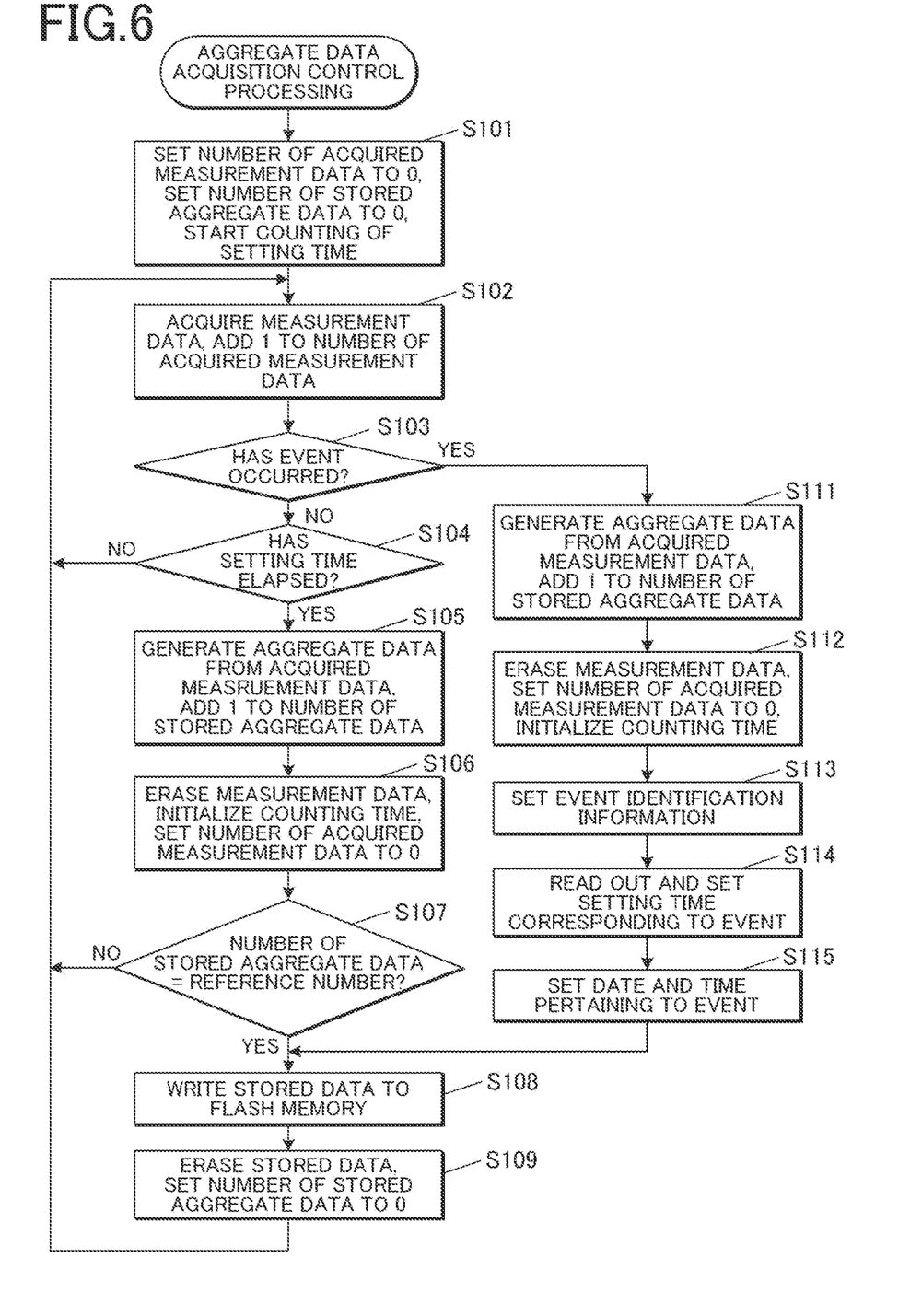
FIG. 6 is a flowchart showing the control procedure for aggregate data acquisition control processing.

FIG. 6 is a flowchart showing the control procedure by the sub CPU 521 of the aggregate data acquisition control processing including the data processing method of this embodiment executed by the second controller 52. The aggregate data acquisition control processing in the embodiment is started with the first startup of the controller 50 (when the secondary battery B is connected) and operates continuously.

When the aggregate data acquisition control processing is started, the sub CPU 521 sets the number of acquired measurement data and the number of stored aggregate data to 0, respectively. The sub CPU 521 causes the timer 523 to start counting of the setting time T0 (step S101, time counting function). The sub CPU 521 acquires measurement data. from the measurement section 64 (acquiring function) and adds one to the number of acquired measurement data (step S102). In the case where the type of the aggregate data, i.e., the representative value, is related to the totalization of the total value or the like, for example, the sub CPU 521 may perform the aggregation processing each time in the processing of step S102, instead of the aggregation processing being performed collectively after the elapse of the setting time T0 in the step S105 described below.

The sub CPU 521 determines whether an event has occurred, i.e., whether the occurrence of some event has been detected (judges whether an event has occurred) (step S103; judging function).

If it is determined (judged) that no event has occurred ("NO" in step S103), the sub CPU 521 determines whether the time counted by the timer 523 (hereinafter referred to as the "timer counting time") has reached the setting time T0 (whether the setting time T0 has elapsed from the start of counting) or not (step S104). If it is determined that the timer counting time has not reached the setting time T0 ("NO" in step S104), the processing of the sub CPU 521 returns to step S102. If it is determined that the timer counting time has reached the setting time T0 ("YES" in step S104), the sub CPU 521 calculates the representative value from the acquired measurement data and the number of acquired measurement data, generates the aggregate data, and add 1 to the number of stored data (step S105; first executing function, and second operation of second executing function).

The sub CPU 521 erases the original measurement data. from which the aggregate data was generated, initializes the counting time and resumes counting by the timer 523, and also returns the number of acquired measurement data to 0 (step S106).

The sub CPU 521 determines whether the number of stored aggregate data is equal to a reference number which is determined in advance (step S107). If it is determined that the number of stored data is not equal to the reference number ("NO" in step S107), the processing of the sub CPU 521 returns to step S102.

When it is determined that the number of stored aggregate data is equal to the reference number ("YES" in step S107), the sub CPU 521 writes the data (information) stored and retained in the register to the flash memory of the second storage 522 (step S108). The data to be written includes, in addition to the aggregate data stored as described above, the event identification information described below and information on the date and time of occurrence of the event indicated by the event identification information. The sub CPU 521 erases the data already written to the flash memory from the register and initializes the number of stored data to 0 (step S109). Then, the sub CPU 521 returns to step S102.

If it is determined (judged) that an event has occurred in the determination processing of step S103 above ("YES" in step S103), the sub CPU 521 generates aggregate data using the measurement data that has been acquired up to this point, and 1 is added to the number of stored aggregate data (step S111; first operation of the second executing function). The sub CPU 521 erases the measurement data used to generate the aggregate data, returns the number of acquired measurement data to 0, initializes the counting time, and resumes counting from the beginning with this timing as the start timing (step S112).

The sub CPU 521 determines the type of the detected event and sets the event identification information according to the content (step S113). The event identification information may be expressed in a small number of bits (number of bytes) in advance corresponding to flag data or the like. This event identification information may have arguments attached thereto. The argument may include, for example, a value indicating the local time (time zone) of the location in an event that specifies a change of the location where the electronic device 1 (i.e., the secondary battery B) is located. Such argument can identify the local time (time pertaining to the battery) at the location where the secondary battery B is located and the changeover thereof. When the setting time T0 is changed in accordance with an event as described above, the sub CPU 521 reads and sets the setting time to be counted next by referring to the second storage 522 (step S114).

The sub CPU 521 sets the date and time pertaining to the event (step S115). This date and time may be the timing at which the event occurred, or the timing at which the event was detected, etc. These event identification information and date and time data are also included in the data stored in the register in step S108. Then, the sub CPU 521 executes the processing of step S108 and subsequent steps after the processing of step S115.

The data indicating the state of the battery including the aggregate data stored and retained in the flash memory of the second storage 522 as described above may be transmitted to an external device determined in advance at an appropriate interval, for example, once a day or at the most recent communication connection after the data of a defined capacity has been stored and retained. The external device may be a server device that analyzes the aggregate data, or a terminal device that can further transfer data to the server device. After the data transfer, the transmitted data stored in the second storage 522 may be erased.

As described above, the second controller 52, which is the data processing device of the electronic device 1 of this embodiment, has a sub CPU 521 and a timer 523 that repeatedly and continuously counts the setting time T0. The sub CPU 521 acquires data indicating the state of the battery (secondary battery B) (e.g., temperature, voltage, charge/discharge current and/or internal resistance of the secondary battery B), and judges whether an event determined in advance (specific event) has occurred. In addition, the sub CPU 521 executes processing determined in advance (aggregation processing) based on the data acquired in the setting time T0 when it is judged that no specific event has occurred between the start and the end of the counting for one setting time T0 by the timer 523 ("NO" in step S103 and steps S104 to S106 in FIG. 6). When it is judged that a specific event has occurred between the start and the end of the counting for one setting time T0, the sub CPU 521 performs at least one of a first operation and a second operation. The first operation is an operation of performing the above processing (aggregation processing) on the basis of the data that was acquired from the start of counting to the stop timing based on the occurrence of the specific event ("YES" in step S103 and steps S111 to S112 in FIG. 6). The second operation is an operation of performing the above processing (aggregation processing) on the basis of the data acquired from the start timing based on the occurrence timing of this event to the end of the counting for one setting time T0 by the timer 523 (step S109, "NO" in step S103, "YES" in step S104, and step S105 in FIG. 6. The processing related to initialization in step S112 may be included in the second operation instead of the first operation).

In this way, since the separation of measurement data is additionally set as appropriate according to the occurrence of a specific event, and processing (aggregation) that includes measurement data both before and after the specific event is not performed, the conditions under which the processed measurement data was obtained can be made clearer. Therefore, this electronic device 1 (second controller 52) can process the data indicating the state of the battery more appropriately.

Furthermore, when it is judged that a specific event has occurred between the start and the end of the counting for one setting time T0, the sub CPU 521 may perform both of the first operation and the second operation described above, i.e. the first operation being the operation of performing the above processing on the basis of the data acquired from the start of the counting to the stop timing based on the occurrence of the specific event, and the second operation being the operation of performing the above processing on the basis of the data acquired from the start timing based on the occurrence timing of this event to the end of the counting of one setting time T0 by the timer 523. Since the processing is performed based on the measurement data separated before and after the occurrence of the specific event, the processing results based on the data indicating the state of the battery immediately before and after the occurrence of the specific event can be obtained appropriately.

When a specific event occurred, the sub CPU 521 of the electronic device 1 may execute the first operation, and initialize the counting of the setting time T0 by the timer 523 at the stop timing to resume the counting from zero.

As a result, the acquisition period of measurement data separated as a processing target becomes a fraction instead of the setting time T0 only immediately before the occurrence of a specific event. Therefore, the results of each processing will be obtained evenly for a while (so the period immediately before the processing period separated by the occurrence of the next specific event) from the timing when the state change or other event occurs. In particular, when the state change is a discontinuous change, followed by a transition period of the battery state, the processing results of the evenly divided data can be preferably obtained. In addition, when the specific event includes an event with a specific time, such as a date change event, the initialization timing of the timer 523 is adjusted by this event, making it easier to synchronize each setting time T0 counted repeatedly by the timer 523 with the actual time.

Alternatively, when a specific event occurred, the sub CPU 521 of the electronic device 1 may execute the second operation, and initialize the counting of the setting time T0 by the timer 523 at the start timing to resume the counting from zero.

Therefore, the results of each processing will be obtained evenly for a while (to the period immediately before the processing period separated by the occurrence of the next specific event) from the timing when the state change or other event occurs. In particular, when the state change is a discontinuous change, followed by a transition period of the battery state, the processing results of the evenly divided data can be preferably obtained. In addition, when the specific event includes an event with a specific time, such as a date change event, the initialization timing of the timer 523 is adjusted by this event, making it easier to synchronize each setting time T0 counted repeatedly by the timer 523 with the actual time.

The specific events include the start and end of charging of the secondary battery B as a battery. In an electronic device 1 that holds a secondary battery B which can be recharged and used repeatedly, the voltage change characteristics differ greatly between charging and discharging. By including the start and end of charging as specific events and dividing the data to be processed (aggregated) before and after these specific events, it is possible co obtain data that enables to more appropriately determine the battery status. By adding a minimum or its equivalent level of such appropriate separations, it is possible to obtain more appropriate processed data.

The specific event includes an event that the time pertaining to the secondary battery B, for example, the time at the location where the secondary battery B is located becomes a specific time. In the case where the setting time T0 (aggregation interval) is determined by using a timer 523 that counts the passage of time independently of the timekeeping section 513, there is a gap between the elapsed time counted by the timekeeping section 513 and the elapsed time counted by the timer 523. Therefore, the separations are adjusted with an accurate time as appropriate, and thereby the elapsed times can be synchronized before the gap becomes large. Thus, it is not necessary to explicitly attach date and time information (time stamp) with a large data size to all the processed data. Therefore, the second controller 52 can save the storage capacity of data in the register and process the data indicating the battery status more appropriately by considering the time information.

The data to be acquired includes at least one of the following data: data pertaining to the temperature of the secondary battery B as a battery, data pertaining to the output voltage of the secondary battery B, data pertaining to the charge/discharge current of the secondary battery B, and data pertaining to the internal resistance value of the secondary battery B, which are obtained by measurement pertaining to the secondary battery B as a battery. The charge-discharge characteristics of the secondary battery B as a battery are often greatly affected by the temperature of the secondary battery B. The output voltage, charge/discharge current, and internal resistance are parameters that appropriately represent the characteristics of the secondary battery B. In the electronic device 1, at least some of these data can be processed more appropriately to obtain processing results. In particular, by acquiring data pertaining to the temperature of the secondary battery B, processing results that more accurately indicate the state of the battery can be obtained.

The sub CPU 521 acquires data indicating the state of the battery at intervals shorter than the setting time T0. The processing which is determined in advance and executed by the sub CPU 521 includes aggregation processing of the acquired data (measurement data). That is, by appropriately separating the acquired data by the setting time T0 or the stop timing pertaining to the occurrence of a specific event as described above and performing the aggregation processing, the situation when the original acquired data pertaining to the aggregate data to be obtained was obtained can be made clearer. Moreover, by such aggregation processing, it is possible to obtain the aggregate data that is more concentrated on information that characterizes the state of the secondary battery B in the aggregation period than mere measurement data. In particular, when the sampling interval is narrower than the setting time T0, the overall state of the secondary battery B in the setting time T0 can be properly obtained with fewer representative values (i.e., smaller size).

In the aggregation processing, the representative value according to the measurement data is obtained. This allows the electronic device 1 to obtain aggregate results that more appropriately represent the measurement results. In particular, when a plurality of types of measurement data are acquired, since the electronic device 1 is allowed to determine the most appropriate representative value for each type of acquired data, it is possible to obtain desirable information according to the characteristics of each type of acquired data.

In addition, the sub CPU 521 erases the data to which processing including the aggregation processing has been performed. After the state of the secondary battery B indicated by the plurality of pieces of measurement data is indicated in aggregate by the aggregate data as described above, it is not necessary to continue to retain the individual pieces of measurement data in the register. This allows the electronic device 1 to reduce the amount of data to be stored in the register.

The second controller 52 has a second storage 522 having a non-volatile memory such as a flash memory that stores the results of the aggregation processing. When the results from the aggregation processing performed a reference number of times (two or more, e.g., three times) or more are stored and retained by the registers of the sub CPU 521, the sub CPU 521 collectively stores the retained information including the results in the second storage 522. In this way, by reducing the frequency of writing to the second storage 522, power consumption related to the writing operation can be reduced. In particular, the product life of the electronic device 1 can be extended by reducing the number of periodic writings to a storage that has a limit to the number of writings, such as a flash memory.

The sub CPU 521 sets the setting time T0 according to the type of event that has occurred. In the electronic device 1, since the speed of charging and discharging of the secondary battery B varies greatly depending on the content of the processing to be executed and whether the battery is charged or not, by shortening the setting time T0 especially in cases where the speeds of charging and discharging are large, information indicating the state of the secondary battery B can be obtained with greater accuracy. On the other hand, by not uniformly pre-setting the setting time T0 to a short time, it is possible to suppress the increase of data that is not important for analysis and efficiently store and retain aggregate data.

Alternatively, the setting time T0 may be a fixed value regardless of the type of event or other factors. This makes it easier to control the execution timing of the processing determined in advance. Even in this case, the electronic device 1 (second controller 52) can still process the data indicating the battery status more appropriately.

The sub CPU 521 acquires information pertaining to the type of the specific event and the time when the specific event has occurred, and retains the information so as to be associated with the information obtained by the processing determined in advance. In other words, by retaining the time (date and time) information of specific events that occur at irregular timings, the acquisition time (date and time) of each processed data can be identified. In particular, since it is possible to generally calculate backwards the date and time of data that has been processed periodically every setting time T0 without a specific event occurring, the time can be identified with at least as much accuracy as the setting time T0, even if time information is not explicitly attached to the data that has been processed periodically. Furthermore, when a date change is included in a specific event, the synchronization of the date and time is also adjusted, so that the time can be identified with more appropriate accuracy even for data that has been processed periodically. Accordingly, the electronic device 1 eliminates the need for the sub CPU 521 to obtain the information on the date and time counted by the timekeeping section 513 from the first controller 51 each time the processing determined in advance is executed. In particular, since there is no need to start up the first controller 51 every time in a situation where the first controller 51 is not operating, power consumption can be reduced.

The electronic device 1 of this embodiment also includes a second controller 52 as the data processing device described above, and a measurement section 64 that performs measurements pertaining to the state of the battery and generates the data. By having the second controller 52 perform the above processing, the data indicating the state of the secondary battery B can be properly processed without placing a large load or restriction on the original operation of the electronic device 1.

In addition, the data processing method of this embodiment includes: acquiring data indicating the state of the secondary battery B; counting a setting time T0 repeatedly and continuously; judging whether an event determined in advance has occurred; executing processing (aggregation processing) determined in advance based on the measurement data that was acquired in the setting time T0 in response to judgement that no specific event has occurred between the start and the end of counting of the setting time T0; and executing at least one of a first operation and a second operation in response to judgement that an event has occurred between the start and the end of counting of the setting time T0, the first operation being an operation of performing the above processing based on the data acquired from the start of the counting to the stop timing based on the occurrence of the event, and the second operation being an operation of performing the above processing based on the measurement data acquired from the start timing based on the occurrence timing of the event to the end of the counting for one setting time T0.

Thus, in this data processing method, since the data indicating the battery status is processed (aggregated) for each separated measurement data while adding and setting separations according to the occurrence of a specific event, the conditions under which the processed measurement data was obtained can be made clearer. Therefore, according to this data processing method, it is possible to process the measurement data more appropriately.

In addition, by installing and executing the program 5221 pertaining to the aggregate data acquisition control processing of this embodiment in a computer and causing a processor to control operation, it is possible to process the measurement data indicating the state of the battery more appropriately with minimal use of hardware and processing.

The present disclosure is not limited to the above embodiment, and various changes can be made.

For example, in the above embodiment, the sub CPU 521 performs the acquisition and processing of the data indicating the state of battery in the controller 50 having two CPUs (main CPU 511 and sub CPU 521), but the subject which performs the processing is not limited thereto. The main CPU 511 may perform the processing or the processing may be distributed to a plurality of CPUs. The processing may also be performed by a single CPU of an electronic device 1 (data processing device) that does not have two CPUs. Alternatively, separately from the processing of the CPU for the original operation of the electronic device 1, another CPU, for example, the CPU of the controller 31 of the microcomputer 30, may perform the various processing and data storage and retention of this embodiment. Also, part of the processing may be performed by dedicated hardware logic circuits, etc., instead of the CPU.

In the above embodiment, aggregate data obtained a plurality of times are stored together in the flash memory, but the storing manner of the aggregate data is not limited to this. The aggregate data may be stored each time it is obtained. In particular, if there is no need to worry about the limit of the number of times to write, or if there is no problem with power consumption related to the writing processing, the obtained aggregate data may be stored sequentially.

In the above embodiment, the aggregation processing is performed at the timing of the occurrence of the above events and at the time when the setting time T0 elapses, but the processing which is determined in advance and performed at these timings (by the program 5221) is not limited to the aggregation processing. For example, data array in a period may be compressed and processed in a certain format, or the measurement data (parameters) or aggregate data may be transmitted to an external device by a certain communication unit. Also, in the case of data aggregation, instead of obtaining representative values, for example, the frequency distribution for each given value width may be obtained by histogramming.

In the above embodiment, the measurement data is acquired at intervals shorter than the setting time T0. However, depending on the type of data, some data may be measured and acquired once within the setting time T0. Also, the parameters may include parameters for which data measurement is not performed in some cases depending on the operating conditions of the electronic device 1.

The above embodiment has been described assuming that the occurrence of an event is judged in almost real time and the stop timing is almost the same as the timing of occurrence of the event, but the judgement of occurrence of an event is not limited to this. In fact, the occurrence of an event may be judged intermittently, for example, in the same cycle as data acquisition. In this case, the simultaneously acquired data may be treated as data before the occurrence of the event or data after the occurrence of the event. Whether the data is before or after the occurrence of the event may be determined for each data, depending on the type of data.

In the above embodiment, date change events, charging start/end/system-switching events, and wireless communication execution events are listed as specific examples, but the specific events are not limited to these events. Other events such as the start/end of execution of application programs with high power consumption may also be included. In addition, the specific events may include whether the first controller 51 is operating, i.e., switching between the normal operation mode and the power saving mode. When the secondary battery B is removed or attached due to battery replacement or other reasons, the processing may be started again from the time of restart due to the removal or attachment.

In the above embodiment, voltage, current and temperature are measured as data indicating the state of the battery, but other measurements may be included in the data, or only some of these three measurements may be included.

In the above embodiment, a secondary battery B, such as a lithium-ion battery, was used as the battery, but the battery is not limited to this. Even for a non-rechargeable battery (primary battery) such as a dry cell battery, it is similarly possible to acquire data corresponding no the usage state of the battery and its state more appropriately. In this case, the charge start event and charge end event need not be included in specific events (state change events). In the case of an electronic device 1 in which a secondary battery B and a primary battery can be exchanged or used together, the availability of recharging and the presence or absence of charge start event/charge end event may be determined by automatic judgment by a microcontroller 30 or the like, or by an input operation by a user to an operation reception section 62.

In the above embodiment, date change is described as an event occurrence timing, but the event occurrence timing need not be this timing. For example, a specific time in the middle of the night may be set as the event occurrence timing so that it does not overlap with the processing related to the date and time change or other processing.

In the above embodiment, when aggregate data is generated, the measurement data of the source of the aggregate is erased, but the erasing operation does not necessarily have to be actively performed. It is possible to simply store a determined number of data and erase the previous data by overwriting them in order. In this case, position data indicating from which data to the most recent data is to be aggregated at the next aggregation may be separately retained.

In the above embodiment, a reference umber of (a plurality of) aggregate data is stored and retained in the flash memory and then the reference number of aggregate data is transmitted externally. However, the transmission of aggregate data is not limited to this. The aggregate data may be transmitted externally as soon as it is obtained. Or, the external transmission may be made sequentially only in the normal mode, or the aggregate data may be transmitted externally to an external device between the start event and the end event of communication with the external device which is the destination of the transmission.

In the above embodiment, the value counted by the timer 523 is initialized and returned to zero at the stop timing based on the occurrence of a specific event, but the value does not necessarily have to be returned to zero. While using the above timing as the start timing, counting by the timer 523 may be continued, and processing (aggregation processing) determined in advance may be performed by using the measurement data acquired during the period from the start timing which is same as the stop timing to the timing at which counting is completed (second operation).

In the above mentioned embodiment, when a specific event occurs at a timing in the middle of the time from start of one counting by the timer 523 from zero to before end of the counting, processing (aggregation, the first operation) is performed on the data of the fractional time up to the stop timing pertaining to the occurrence of the specific event. For example, if this fractional time is shorter than a reference time, the measurement data acquired during this fractional time may be simply deleted and the first operation may not be performed. In this case, only the second operation using the measurement data acquired after the start timing may be performed. Conversely, if the value counted by the timer 523 is not initialized and not returned to zero at the stop timing, and the remaining time is shorter than the reference time, the measurement data acquired during the remaining time may be simply deleted and the second operation may not be performed. In this case, only the first operation is performed.

In the above description, a non-volatile memory such as a flash memory possessed by the second storage 522 is used as an example of a computer readable medium for storing the program 5221 pertaining to the acquisition control of data indicating the state of the battery of the present disclosure, but the medium is not limited thereto. As other computer readable media, it is possible to apply other non-volatile memory such as HDD (Hard Disk Drive) and MRAM, mask ROM, and portable recording media such as CD-ROM and DVD disks. Carrier waves are also applicable to the present disclosure as a medium for providing the program data via communication lines.

Other specific configurations, contents of processing operations and procedures, etc. shown in the above embodiment can be changed as necessary without departing from the scope of the present disclosure.

Although several embodiments of the present disclosure have been described, the scope of the present disclosure is not limited to the above described embodiments and includes the scope of the present disclosure that is described in the claims and the equivalents thereof.

What is claimed is:

1. A data processing device comprising:
   at least one processor that executes a program stored in at least one memory; and
   a timer that repeatedly and continuously counts a setting time, wherein
   the at least one processor
   acquires data indicating a state of a battery,
   judges whether an event determined in advance has occurred,
   executes processing determined in advance based on the data acquired in the setting time in response to judgement that the event has not occurred between start and end of counting for one setting time by the timer, and
   executes at least one of a first operation and a second operation in response to judgement that the event has occurred between the start and the end of the counting for the one setting time, the first operation being an operation of performing the processing based on the data acquired from the start of the counting to a stop timing based on occurrence of the event, and the second operation being an operation of performing the processing based on the data acquired from a start timing based on an occurrence timing of the event to end of counting for one setting time by the timer.

2. The data processing device according to claim 1, wherein the at least one processor performs the first operation and the second operation in response to the judgement that the event has occurred between the start and the end of the counting for the one setting time.

3. The data processing device according to claim 1, wherein the at least one processor performs the first operation, and initializes the counting of the setting time by the timer at the stop timing to resume the counting from zero by the timer.

4. The data processing device according to claim 1, wherein the at least one processor performs the second operation, and initializes the counting of the setting time by the timer at the start timing to resume the counting from zero by the timer.

5. The data processing device according to claim 1, wherein the event includes start and end of charging of the battery.

6. The data processing device according to claim 1, wherein the event includes an event that a time pertaining to the battery becomes a specific time.

7. The data processing device according to claim 1, wherein the data includes at least one of data pertaining to a temperature of the battery, data pertaining to an output voltage of the battery, data pertaining to a charge/discharge current of the battery, and data pertaining to an internal resistance value of the battery, which are obtained by measurement pertaining to the battery.

8. The data processing device according to claim 1, wherein
the at least one processor acquires the data at a shorter interval than the setting time, and
the processing includes aggregation processing of the acquired data.

9. The data processing device according to claim 3, wherein a representative value corresponding to the data is obtained in the aggregation processing.

10. The data processing device according to claim 8, wherein the at least one processor erases the data to which the processing including the aggregation processing has been performed.

11. The data processing device according to claim 8, wherein
a result of the aggregation processing is stored in the at least one memory, and
in response to retention of results by the aggregation processing performed a reference number of times or more, the reference number being two or more, the at least one processor collectively stores retained information including the results in the at least one memory.

12. The data processing device according to claim 8, wherein the at least one processor sets the setting time according to a type of the event that has occurred.

13. The data processing device according to claim 1, wherein the setting time is a fixed value.

14. The data processing device according to claim 1, wherein the at least one processor acquires information pertaining to a type of the event and a time when the event has occurred, and retains the acquired information so as to be associated with information obtained by the processing.

15. An electronic device comprising the data processing device according to claim 1, wherein the at least one processor performs measurement pertaining to the state of the battery and generates the data.

16. A data processing method by a data processing device, the method comprising:
acquiring data indicating a state of a battery;
counting a setting time repeatedly and continuously;
judging whether an event determined in advance has occurred;
executing processing determined in advance based on the data acquired in the setting time, in response to judgement that the event has not occurred between start and end of counting for one setting time, and
executing at least one of a first operation and a second operation in response to judgement that the event has occurred between the start and the end of the counting for the one setting time, the first operation being an operation of performing the processing based on the data acquired from the start of the counting to a stop timing based on occurrence of the event, and the second operation being an operation of performing the processing based on the data acquired from a start timing based on an occurrence timing of the event to end of counting for one setting time.

17. A non-transitory computer readable storage medium storing a program that causes a computer to execute:
an acquiring function of acquiring data indicating a state of a battery;
a time counting function of repeatedly and continuously counting a setting time;
a judging function of judging whether an event determined in advance has occurred;
a first executing function of executing processing determined in advance based on the data acquired in the setting time in response to judgement that the event has not occurred between start and end of counting for one setting time by the time counting function; and
a second executing function of executing at least one of a first operation and a second operation in response to judgement that the event has occurred between the start and the end of the counting of the setting time, the first operation being an operation of performing the processing based on the data acquired from the start of the counting to a stop timing based on occurrence of the event, and the second operation being an operation of performing the processing based on the data acquired from a start timing based on an occurrence timing of the event to end of counting for one setting time by the time counting function.

* * * * *

UNITED STATES PATENT AND TRADEMARK OFFICE
CERTIFICATE OF CORRECTION

PATENT NO. : 11,720,139 B2
APPLICATION NO. : 17/547063
DATED : August 8, 2023
INVENTOR(S) : Hideo Suzuki et al.

Page 1 of 1

It is certified that error appears in the above-identified patent and that said Letters Patent is hereby corrected as shown below:

In the Claims

In Claim 9, Line 1, delete "claim 3" and insert --claim 8--.

Signed and Sealed this
Twenty-sixth Day of September, 2023

Katherine Kelly Vidal
*Director of the United States Patent and Trademark Office*